Nov. 7, 1950 J. T. HAYWARD 2,528,882
METHOD OF LOGGING WELLS
Filed Nov. 24, 1945 2 Sheets—Sheet 1
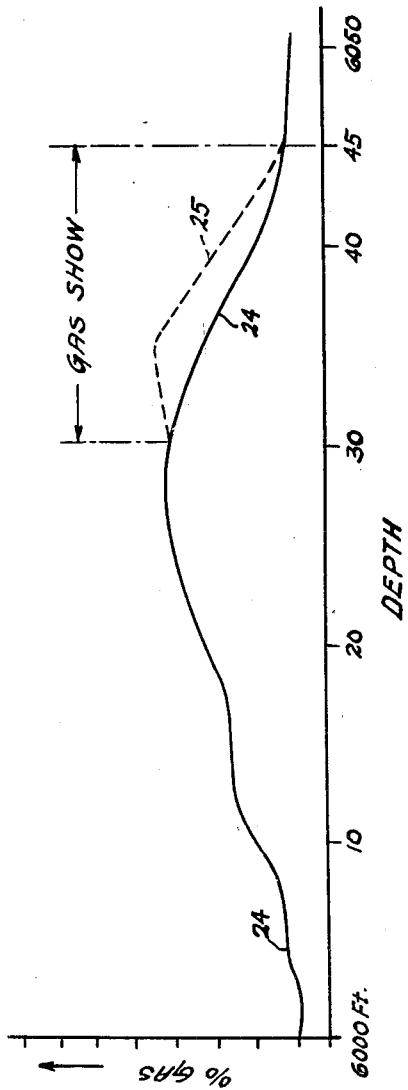
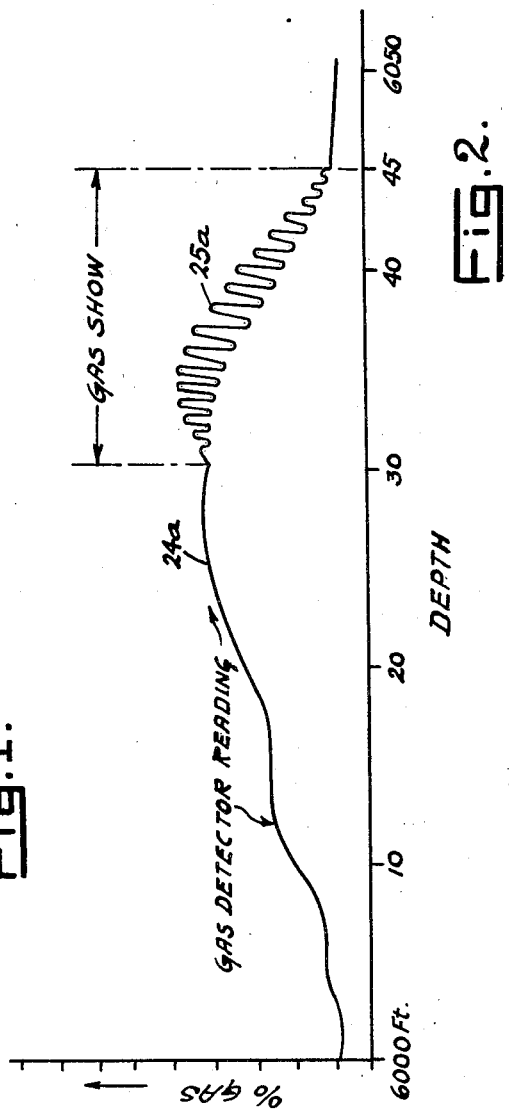
INVENTOR.
J. T. Hayward
BY
R. Werlin
ATTORNEY.

Nov. 7, 1950     J. T. HAYWARD     2,528,882
METHOD OF LOGGING WELLS
Filed Nov. 24, 1945     2 Sheets-Sheet 2

INVENTOR.
J. T. Hayward
BY
ATTORNEY.

Patented Nov. 7, 1950

2,528,882

UNITED STATES PATENT OFFICE 2,528,882

METHOD OF LOGGING WELLS

John T. Hayward, Tulsa, Okla.

Application November 24, 1945, Serial No. 630,573

19 Claims. (Cl. 73—153)

This invention relates to a method of logging wells and particularly to a continuous method of logging wells during the drilling thereof.

More particularly, this invention relates to a method of logging wells during the drilling thereof by the rotary method, in which a stream of mud-laden fluid is circulated through the well, and in which the increments of the fluid leaving the well are analyzed for the contents of the strata dispersed therein by the drill at the bottom of the well, the increments being correlated with the depths of said strata. Such a method was described in detail and claimed in my U. S. Patent No. 2,214,674, dated September 10, 1940.

The present invention has for its principal object, the improvements in the patented method, by which the changes in composition of the mud fluid, resulting from the dispersal therein of the portion of the stratum cut by the drill bit, may be determined with a greater degree of certainty than has heretofore been possible, and by which the increments of the mud fluid containing the dispersed portion of a stratum may be more accurately correlated with the depth of the stratum.

As described in the forementioned patent, the depth of the stratum is measured in synchronism with the rise of the selected increment of the mud from the drilling zone and said increment, when it emerges from the top of the well, is analyzed to determine the composition and nature of the contents of the core portion of that stratum dispersed in that increment. This method has gone into extensive and successful use in the drilling industry. However, it has been found in some cases that in applying the tests for analysis of the emerging increments of the mud fluid, difficulty may be experienced in distinguishing changes in composition due to the portions of the dispersed strata, from changes due to various other factors which may be present in the normal drilling operation. For example, when analyzing an outgoing increment of the mud fluid for salt water, if no salt water sand is being drilled, there will, nevertheless, be continuous changes in the salinity of the increment passing the sample point on the surface. This is because water is added to the mud during the drilling operation and normally no special precautions are taken to see that all the mud in the system is treated equally, since this would be a practical impossibility if continuous operation is to be maintained. If, therefore, the salinity is measured continuously, as is the normal procedure, there will be humps and peaks in the salinity curve as the mud circulates, quite independent of anything picked up in the drilling zone. Similarly in regard to gas. For example, due to varying viscosity of the mud in successive portions of the stream, gas may be released at varying rates from the mud, producing humps in the gas curve that are not related to happenings in the drilling zone. Similar troubles may be experienced with oil detection. For example, during a trip with the drill pipe, that is, the removal of the drill pipe from the well and its return thereto, the portion of the mud that is in the well may become contaminated with tool joint grease; and, in addition, due to the reduction in pressure caused by the withdrawal of the drill pipe, some crude oil may be sucked into the well from any oil-bearing formation already drilled. When drilling is resumed, this slug of oil-containing mud passes around and around the system and gives periodical variations in the amount of oil shown in the oil detector.

Due to the fact that some oil, gas, and salt water, or other indications are sometimes present in the mud throughout the drilling of wells by the rotary method, it becomes difficult, at times, particularly in continuous testing of the mud, to select those results which are significant of changes resulting from the drilling of a stratum, as distinguished from those results which represent non-significant background variations in the composition of the mud.

It is an important object, therefore, of this invention to provide an improved method by which such significant changes in the mud condition or composition may be readily distinguished from non-significant changes.

The amount of new material picked up by the mud per unit volume thereof in passing through the drilling zone depends upon the drill rate, that is, the vertical rate of progress of the drill in the well, and upon the rate at which the mud is circulated through the well. In accordance with the present invention, therefore, it is proposed to modulate one or both of these drilling operations according to a pre-determined frequency and to detect at the surface changes in the mud condition or composition occurring at the same frequency and thus to distinguish changes in the mud that are significant, from a logging point of view, from changes that are due to random variations.

Other, and more specific objects and advantages of this invention will become readily apparent from the following detailed description when read in conjunction with the accompanying drawings which diagrammatically illustrate the method in accordance with suitable embodiments of this invention.

In the drawings:

Fig. 1 is a chart, included for purposes of comparison and explanation, of a particular test, such as may be obtained by the logging method as practiced in accordance with the disclosures of U. S. Patent No. 2,214,674;

Fig. 2 is a similar chart for the same test obtained in accordance with the method of this invention;

Figure 3:
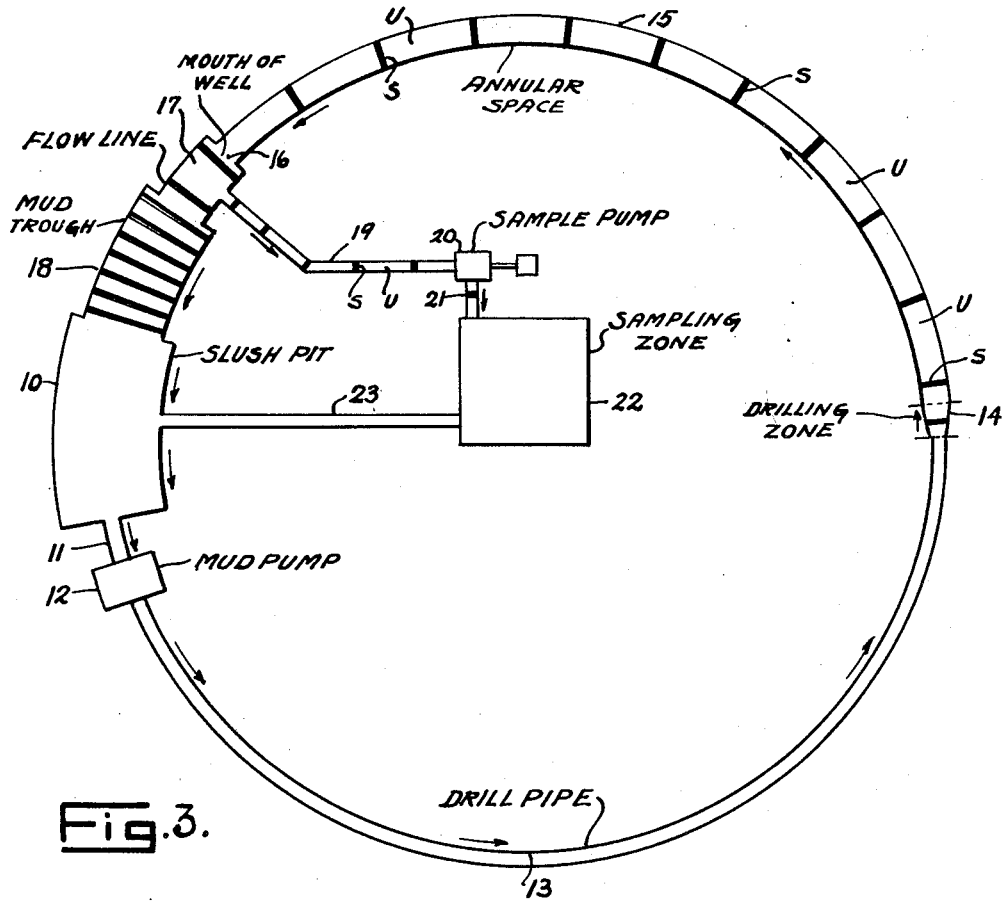
Fig. 3 illustrates diagrammatically the circuit employed in conventional rotary drilling, modified to illustrate the steps in accordance with the present invention.

Referring first to Fig. 3, the circular diagram there shown, is employed to illustrate the cyclic flow of the mud fluid through a well, as it normally travels in the usual rotary drilling operation. This type of diagram, in which various segments thereof designate the several portions of a conventional drilling system, is employed for purposes of clearer explanation of this invention as will appear hereinafter and because the parts of the system, including the apparatus employed, are well known and understood in the art and can be readily related to the portions illustrated diagrammatically in Fig. 3. A circuit of this kind is illustrated in a more conventional manner in the foresaid U. S. Patent No. 2,214,674.

The circuit of the drilling mud may be considered as beginning in the slush pit 10, which normally contains the supply of drilling fluid employed in the well. The character and general composition of such drilling fluids are well understood in the drilling art; and most frequently include a suspension of clay in water, to which is frequently added weighting materials, such as barytes, a gel component, such as Bentonite, and other special ingredients to enable the drilling fluid to accomplish those functions which it is normally required to serve, and particularly to maintain the head of the fluid column in excess of that in the strata penetrated by the drill during logging in accordance with the method of the present invention. The mud is drawn through a pipe 11 by a mud pump 12 and discharged through the drill pipe 13 to the drilling zone 14 at the bottom of the well, in which the drill bit (not shown) cuts out a core of the stratum currently being cut by the drill and disperses the finely divided core portion and any fluid contained therein into the drilling mud, which then flows upward in the well through the annular space 15 to the mouth of the well, indicated at 16, and thence into the flow line 17 from which the mud discharges into the usual mud trough 18, which in turn discharges the mud into the slush pit, completing the cycle. Leading from a suitable point in the flow line, in advance of its discharge into the mud trough 18, is a pipe 19, adapted to divert a small portion of the mud fluid passing through the flow line from the main stream thereof. Pipe 19 is connected to a pump 20, designated as a sample pump, which discharges the diverted stream of mud fluid through a pipe 21 into and through a sampling zone 22, from which the mud is returned through a pipe 23 to the slush pit.

Sample pump 20 may be of any suitable or conventional form, which is designed to withdraw a constant portion of the mud fluid from the flow line and is normally operated at a constant speed in order to effect this purpose.

Sampling zone 22 may include any suitable or conventional apparatus which is adapted to analyze the stream of mud introduced therein by sample pump 20, in order to determine the composition and character of the mud passing therethrough, for the purpose of detecting and measuring the changes in composition or characteristics of the mud fluid resulting from the dispersal therein of the core portions in the drilling zone. These analyses are normally employed for the purpose of logging the strata through which the well is drilled. Such sampling apparatus and their methods of operation are described in the aforesaid U. S. Patent No. 2,214,674, which describes several types of apparatus and method for analyzing the mud fluid for the presence and quantities of gas, oil, salt, and other desired characteristics of the mud fluid. Another apparatus and a method for making comparative analyses of the gas contained in successive increments of the mud fluid is described in my U. S. Patent application Serial No. 265,470, filed April 1, 1939, now U. S. Patent No. 2,489,180. Another apparatus for detecting oil in the mud is described in my U. S. Patent No. 2,213,138, patented August 27, 1940. As stated, sampling zone 22 may include these types of apparatus or other suitable types of apparatus for detecting and measuring oil, gas, salt, natural or induced radio activity, viscosity, etc. in the mud fluid and making quantitative comparisons of these tests for successive increments of the mud fluid. It should be understood that none of these specific methods of analyzing the mud passing through the sampling zone, is a part of this particular invention. It will also be understood that the analyses made in the sampling zone on the successive increments of the mud fluid may be correlated to the depth of the well and the strata thereat to which they relate by the method described in the heretofore mentioned U. S. Patent 2,214,674.

Fig. 1 illustrates, by way of example, a form of curve obtained for the gas evolved from the mud stream in logging the well by a system such as is described in the forementioned U. S. Patent No. 2,214,674 and in the aforementioned application Serial No. 265,470, employing a mud circulating system of the type above mentioned. It will be noted in examining this chart, which is shown for a section of a well being drilled from 6000 to 6050 feet, that the depth is indicated on the horizontal axis, and the percentage of gas on the vertical axis. The curve 24 shows the varying percentages of gas at different depths of the well. As pointed out previously, these variations may be due entirely to the residual gas remaining in the mud, after the mud has completed the circuit, following a previous contact with a gas-containing stratum, and despite the fact that no gas horizon has been penetrated by the drill during the drilling of the section from 6000 to 6050 feet. This residual gas may be that left after the mud has passed from the flow line into and through mud trough 18 and slush pit 10, since in this passage, some gas is continually evolving from the mud and the amount remaining in the mud will vary, depending largely on the viscosity, gel component in the mud and other mud conditions. It will be assumed now that a gas stratum has been penetrated by the drill in the section from 6030 to 6045 feet. The dotted curve 25 will indicate the increase in gas in the mud appearing at the sampling point resulting from the drilling of this section of the well. However, it will be seen that the displacement of the curve due to the increase of gas is not of such a marked character as to be readily distinguishable from the increase shown, for example, in the section of the curve 24 between the depths of approximately 6020 feet and 6030 feet, which is due to a non-significant change in the composition of the mud fluid, such as previously described, since no gas stratum has been penetrated in this section.

As earlier stated, it is the purpose of this invention, as will hereinafter be described, to render unmistakable, on a curve, such as curve 24, or other suitable indicating or recording device, the indication of penetration of a gas-containing stratum by the drill. This is accomplished in accordance with the present invention by modulating in a suitable manner at a predetermined frequency, any one of the several drilling operations which are adapted to vary the rate at which the core portion of a stratum being cut by the drill is dispersed by the drill per unit volume in the mud fluid as it passes that stratum in the drilling zone.

The drilling operations which lend themselves most readily to this type of regulation are the rate of vertical progress of the drill and the rate of circulation of the mud fluid. It will be understood that, if the drilling rate is speeded up, as by increasing the speed of the rotary table, or by increasing the weight on the bit, or by other means well understood by those experienced in this art, while the rate of circulation of the mud is maintained constant, a larger proportion of the core being cut out by the drill will be dispersed in a unit volume of the mud fluid passing the bit at that time. Similarly, if the drilling rate is kept constant and the mud fluid is circulated at decreased speed, a greater proportion of the core portion will be dispersed in a unit volume of the mud fluid. If the drilling rate is decreased while the mud circulation is constant, a lesser proportion of the core portion of the stratum will be dispersed in a unit volume of the mud. Similarly, if the rate of circulation of the mud is increased while the drilling rate is constant, a smaller proportion of the core portion will be dispersed in a unit volume of the mud fluid. Therefore, by alternately increasing and decreasing the drilling rate while holding the mud circulation constant, a corresponding pattern of increased and decreased concentration of the core portion in successive increments of the drilling mud will occur. Similarly, by changing the rate of circulation of the mud at periodical intervals, either of time or volume, while maintaining the drilling rate constant, a corresponding pattern of changing concentration of the dispersed core portion in the drilling mud will occur. To intensify the differences in concentration in the successive increments of the mud fluid, it may be desirable, in some cases, to vary the drilling rate and the mud circulation rate in opposite directions at the same intervals. Thus, when the drilling rate is high and mud rate relatively low, a maximum amount of the core portion will be dispersed in a unit volume of the mud fluid. When the drilling rate is low and the mud circulation rate high, a minimum concentration of the core portion will be present in a unit volume of the drilling mud.

Modulation of the selected drilling operation to effectuate the purposes of this invention may be accomplished in various ways. For example, if it is desired to modulate the drilling rate this may be accomplished readily and in a simple manner by merely advancing the drill at a relatively high rate for a short period, say, three minutes, by speeding up the rate of rotation of the rotary table and by increasing the weight on the drill bit for that period and then decreasing the rate of advance of the drill bit for a succeeding predetermined period, which may be either of the same or different length as the period of rapid drilling, by reversing one or both of these procedures. This operation may be repeated during the drilling of the entire well, if desired, or it may be found desirable to carry on the rate of drilling in this modulated manner during the drilling of selected sections of the well, particularly where other evidence normally available to the operator indicates that the drill is in or approaching formations likely to be of special interest for logging purposes.

With the drill rate modulated in the manner described and with the rate of circulation of the mud fluid held constant, it will be seen that as the mud fluid flows through the drilling zone, the portion thereof passing the bit while the accelerated drilling is taking place will receive, per unit volume, of the mud, a relatively larger quantity per unit volume of the stratum thus drilled than will the succeeding increment of the mud fluid passing through the drilling zone while the decelerated rate of drilling is taking place. These increments of the mud fluid, when analyzed at the top of the well, will then show greater and lesser proportions of the contents of the drilled strata portion deposited therein by the drill bit and these variations will appear in a pattern corresponding to the frequency pattern applied to the drilling rate.

Fig. 2 shows a chart, directly comparable to that of Fig. 1, which illustrates the results obtained in the curve of the gas analysis of the mud fluid, as a result of such modulation of the drilling rate. It will be seen that the section of the curve, between 6000 feet and 6030 feet, indicated by the numeral 24a, is the same in contour as the corresponding portion of curve 24 in Fig. 1, despite the modulation of the drilling rate. Since no gas has been added to the mud fluid by the drilling of this section of the well, its original gas composition will not be affected and the percentage of gas being measured in the drilling mud which has passed this section of the well will not be varied by the modulation of the drilling rate. However, upon penetration of a gas bearing stratum between 6030 feet and 6045 feet, the effect of adding to the mud increasing and decreasing amounts of the drilled portion of this stratum by the described modulation of the drilling rate, will be a variation in the percentage of gas in the mud fluid passing this stratum during its drilling which will have a regular pattern varying in accordance with the frequency of modulation of the drilling rate. Section 25a of the curve in Fig. 2 illustrates this result. In other words, the gas analysis curve will show a frequency pattern corresponding closely to the frequency of modulation of the drilling rate.

The frequency cycle of the drilling rate may be in terms of units of mud volume entering the well, rather than in time intervals, that is, the same result may be obtained by drilling at a high rate during the passage of, say, fifty barrels of mud, and at a slow rate during the passage of a similar or other pre-determined volume of mud and repeating the succession for any desired interval.

As indicated previously, similar results may be obtained by holding the drilling rate constant and varying or modulating the rate of circulation of the mud fluid in accordance with any desired or pre-determined frequency. This will generally be found more expedient in actual practice than varying the drilling rate. The mud circulation rate could be varied, for the purposes of this invention, either according to time or according to volume. That is, the circulation rate could be varied at say, three minute intervals, or at intervals of passage into the well of say, fifty barrels of mud fluid. Such modulation of the mud circulation rate may be accomplished in various ways which will be readily apparent to those skilled in this art.

Figure 4:
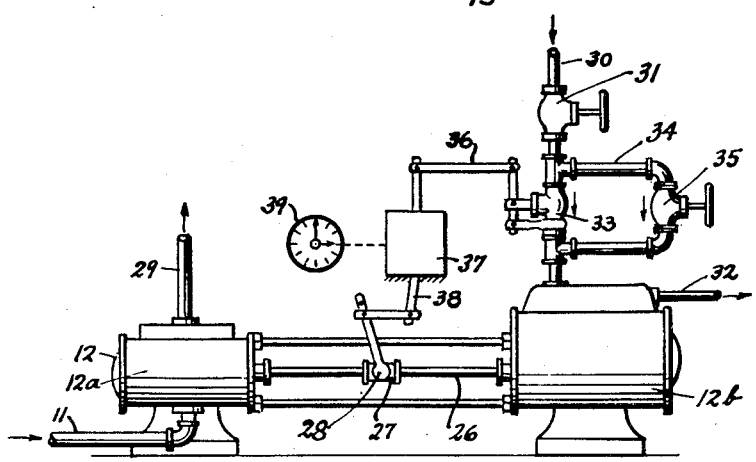
Fig. 4 illustrates a detail of apparatus which may be employed in the performance of the method in accordance with this invention.

Fig. 4 illustrates diagrammatically an arrangement for modulating the mud circulation rate when using the conventional reciprocating pump for circulating the mud in the system. As illustrated, pump 12 is a conventional, steam-driven, reciprocating pump having a liquid end 12a and a steam end 12b and the usual rod 26 reciprocable between these ends. A cross-head 27 mounted on rod 26 drives the conventional rocker arms 28, only one of which is shown. Suction pipe 11 is shown connected to the liquid end of the pump which is provided with a discharge pipe 29 which leads to drill pipe 13. A steam line 30 fitted with a main valve 31 is connected into the steam end of the pump, which is provided with an exhaust line 32. Mounted on steam line 30 is a throttle valve 33 and a by-pass 34 connects into steam line 30 on opposite sides of valve 33. A valve 35 is interposed in by-pass 34 and is normally set to feed just enough steam to the pump to drive it at the minimum speed consistent with safe drilling, while throttle valve 33 is closed. The stem of valve 33 is connected by a linkage 36 to a control mechanism 37 which is also connected by a suitable linkage 38 to rocker arm 28. Control mechanism 37 is of any suitable or conventional form, so arranged that upon the completion of a pre-determined number of cycles by rocker arm 28 the mechanism will open throttle valve 33 and allow additional steam to enter the pump to increase its speed to a corresponding, pre-determined rate, and upon the completion of a further pre-determined number of cycles by rocker arm 28 at the higher speed, throttle valve 33 will be closed and the speed returned to that at which the pump was originally operated. Control mechanism 37 may be one of several types well-known to those skilled in the art, and may include a servo-motor or other type motor mechanisms which are well-known. These pre-determined changes in speed are repeated throughout the drilling operation. For example, the pre-determined speed at which the pump is operating while throttle valve 33 is closed may be 6 cycles per minute for a total of three minutes, or 18 cycles, whereupon control mechanism 37 will open throttle valve 33 to permit the pump to attain a speed of, say, 60 cycles a minute for the next three minutes, or a total of 180 cycles, upon the completion of which the mechanism will again close throttle valve 33 and the operation is repeated. Instead of opening and closing throttle valve 33 in accordance with the number of cycles of the pump, as measured by the movements of rocker arm 28, control mechanism 37 may be time-controlled in a manner which will be well understood by those skilled in the art whereby a clock mechanism, designated generally by the numeral 39, may be employed to open and close throttle valve 33 at suitable, pre-determined time intervals of, for example, three minutes each. By thus varying the supply of steam to the pump, it will be readily seen that the volume of mud circulated at the different speeds will be proportional thereto. It will be understood that other types of timing or control mechanism may be employed in place of that described for modulating the mud circulation. It will be understood also that the time intervals of three minutes, or changes in pump rate of from six to sixty cycles per minute are given merely by way of example and that other time intervals or cycle rates may be employed. Also the time intervals may be the same or different for the high and low speed periods of operation.

It will be understood that any suitable modulation frequency may be used for either the drilling rate or the mud circulation rate and that the frequency wave form resulting from the modulation need not be completely regular or harmonic. It will be sufficient for the purposes of this invention to use any pre-determined wave form resulting from the modulation of the selected drilling operation which will permit the ready selection of those results of the analysis of the mud fluid leaving the well which have a similar frequency or wave form. The appearance of such a pattern in the analytical results will immediately distinguish them to the operator from the other analytical results which are not so varied and in correlation of the analytical results with the depth of the strata to which they are related, the unique analytical pattern obtained in accordance with this invention will fix more sharply the limits of the stratum responsible for that pattern.

It will be understood, of course, that having detected the characteristic pattern in the analytical results, the operator may readily determine therefrom a value representative of the change produced in the drilling fluid by the drilling of the stratum producing that pattern as by taking an average of the varying values of the change appearing in said pattern, or by selecting some suitable component of the varying values.

The variation in composition resulting from the modulation of a drilling operation, of the kind described, is also illustrated graphically in Fig. 3, wherein the shaded portions S of the stream of mud fluid leaving drilling zone 14 are intended to represent the portions of the mud fluid containing the relatively larger proportions of the core of the stratum being drilled in the drilling zone. The unshaded areas U, between shaded areas S, represent the increments of mud fluid containing the relatively lesser proportion of the strata portions and the spacing of the shaded areas corresponds to the frequency cycle employed. This distribution will be maintained in the passage of the mud fluid through annular space 15 and flow line 17, because the stream of mud fluid is closely confined therein and little intermixing of successive increments of the mud fluid will occur in its passage through these sections of the well. The same distribution pattern will be retained in the portion of the mud fluid directed through pipe 19 and pump 20 to the sampling zone.

As the remainder of the mud stream flows through the mud trough 18, which normally has greater area than the preceding sections of the mud circuit, the areas of differing composition of the mud stream tend to merge and when the stream enters and flows through the slush pit the mud becomes thoroughly mixed, assisted by conventional stirring or mixing devices ordinarily employed, and the composition of the mud fluid will have become relatively uniform again by the time it reaches the suction pipe 11 once again.

It will be understood that while the foregoing description has dealt primarily with the analysis of gas in the mud fluid, this is merely by way of example and other tests or analyses, such as analyses for oil, salt, radio activity, viscosity, etc., may be similarly employed. It will further be understood that, in accordance with this invention, such analyses may be made not only of the fluid contents of the strata portions dispersed by the drill in the drilling fluid, but also of the strata portions themselves, that is, the solid cuttings composing these strata portions.

Many other modifications of the details of this invention may be employed without departing from the principles set forth. For example, instead of visually examining the curve obtained by a given type of analysis of the mud for the particular frequency pattern, the curve may be analyzed electrically for the desired frequency component by devices for this purpose which will be known to those skilled in this art.

It will be understood by those skilled in the art that the method, in accordance with this invention, may also be successfully applied when the mud circulation through the well is in the reverse direction from that described, that is, when the mud is circulated down through the annular space 15 and up through the drill pipe 13 to the surface.

What I claim and desire to secure by Letters Patent is:

1. The method of logging wells being drilled by the rotary method in which a drilling fluid circulated through the well is analyzed at the top of the well for the contents of the strata portions dispersed therein by the drill, comprising, modulating a drilling operation at a predetermined frequency adapted to correspondingly vary the rate of dispersal by said drill of said contents of said strata per unit volume of said drilling fluid, and analyzing said drilling fluid for said contents appearing therein in a concentration pattern corresponding to said frequency.

2. The method of logging wells being drilled by the rotary method in which a drilling fluid circulated through the well is analyzed at the top of the well for the contents of the strata portions dispersed therein by the drill, comprising, modulating a drilling operation at a predetermined frequency adapted to correspondingly vary the rate of dispersal by said drill of said contents of said strata per unit volume of said drilling fluid, analyzing said drilling fluid for said contents appearing therein in a concentration pattern corresponding to said frequency, and correlating said pattern with the depths of said strata.

3. The method of logging wells being drilled by the rotary method in which a drilling fluid circulated through the well is analyzed at the top of the well for the contents of the strata portions dispersed therein by the drill, comprising, modulating the rate of advancement of the drill at a pre-determined frequency, whereby the rate of dispersal by said drill of said contents of said strata per unit volume of said drilling fluid is correspondingly varied, and analyzing said drilling fluid for said contents appearing therein in a concentration pattern corresponding to said frequency.

4. The method of logging wells being drilled by the rotary method in which a drilling fluid circulated through the well is analyzed at the top of the well for the contents of the strata portions dispersed therein by the drill, comprising, modulating the rate of advancement of the drill at a pre-determined frequency while maintaining the circulation of said drilling fluid at a substantially constant rate, whereby the rate of dispersal by said drill of said contents of said strata per unit volume of said drilling fluid is correspondingly varied, and analyzing said drilling fluid for said contents appearing therein in a concentration pattern corresponding to said frequency.

5. The method of logging wells being drilled by the rotary method in which a drilling fluid circulated through the well is analyzed at the top of the well for the contents of the strata portions dispersed therein by the drill, comprising, modulating the rate of circulation of said drilling fluid through the well at a pre-determined frequency, whereby the rate of dispersal by said drill of said contents of said strata per unit volume of said drilling fluid is correspondingly varied, and analyzing said drilling fluid for said contents appearing therein in a concentration pattern corresponding to said frequency.

6. The method of logging wells being drilled by the rotary method in which a drilling fluid circulated through the well is analyzed at the top of the well for the contents of the strata portions dispersed therein by the drill, comprising, modulating the rate of circulation of said drilling fluid through the well at a pre-determined frequency, while maintaining the advancement of said drill at a substantially constant rate, whereby the rate of dispersal by said drill of said contents of said strata per unit volume of said drilling fluid is correspondingly varied, and analyzing said drilling fluid for said content appearing therein in a concentration pattern corresponding to said frequency.

7. The method of logging wells being drilled by the rotary method in which a drilling fluid circulated through the well is analyzed at the top of the well for the contents of the strata portions dispersed therein by the drill, comprising, modulating the rate of advancement of the drill at a pre-determined frequency, simultaneously modulating the rate of circulation of the drilling fluid at the same frequency but in reverse direction to thereby produce a characteristic pattern of relatively high and low concentration of the contents of said strata portions in said drilling fluid, and analyzing said drilling fluid for said contents appearing therein in said pattern.

8. In the logging of wells being drilled by the rotary method by analysis of the drilling fluid circulated through the well during the drilling thereof, the method of distinguishing significant changes in the gas content of the drilling fluid produced by the drilling of a gas-containing stratum from non-significant changes otherwise produced in said drilling fluid, comprising, modulating a drilling operation at a pre-determined frequency adapted to produce a characteristic concentration pattern in the drilling fluid of the gas contents of said stratum dispersed therein by the drill, and analyzing said drilling fluid 2,528,882

11 emerging from the well for said gas contents appearing therein in said pattern.

9. In the logging of wells being drilled by the rotary method by analysis of the drilling fluid circulated through the well during the drilling thereof, the method of distinguishing significant changes in the gas content of the drilling fluid produced by the drilling of a gas-containing stratum from non-significant changes otherwise produced in said drilling fluid, comprising, modulating the rate of advancement of the drill at a pre-determined frequency while maintaining the circulation of said drilling fluid at a substantially constant rate to thereby produce a characteristic concentration pattern in the drilling fluid of the gas contents of said stratum dispersed therein by the drill, and analyzing said drilling fluid emerging from the well for said gas contents appearing therein in said pattern.

10. In the logging of wells being drilled by the rotary method by analysis of the drilling fluid circulated through the well during the drilling thereof, the method of distinguishing significant changes in the gas content of the drilling fluid produced by the drilling of a gas-containing stratum from non-significant changes otherwise produced in said drilling fluid, comprising, modulating the rate of circulation of said drilling fluid through the well at a pre-determined frequency while maintaining the advancement of said drill at a substantially constant rate to thereby produce a characteristic concentration pattern in the drilling fluid of the gas contents of said stratum dispersed therein by the drill, and analyzing said drilling fluid emerging from the well for said gas contents appearing therein in said pattern.

11. In the logging of wells being drilled by the rotary method by analysis of the drilling fluid circulated through the well during the drilling thereof, the method of distinguishing significant changes in the gas content of the drilling fluid produced by the drilling of a gas-containing stratum from non-significant changes otherwise produced in said drilling fluid, comprising modulating the rate of advancement of the drill at a pre-determined frequency, simultaneously modulating the rate of circulation of the drilling fluid at the same frequency but in reverse direction to thereby produce a characteristic concentration pattern in the drilling fluid of the gas contents of said stratum dispersed therein by the drill, and analyzing said drilling fluid emerging from the well for said gas contents appearing therein in said pattern.

12. In the logging of wells being drilled by the rotary method by analysis of the drilling fluid circulated through the well during the drilling thereof, the method of distinguishing significant changes in the character of the drilling fluid produced by the drilling of a stratum from non-significant changes otherwise produced in said drilling fluid, comprising, modulating a drilling operaiton at a pre-determined regular frequency adapted to produce a correspondingly varied concentration in the drilling fluid of the contents of said stratum dispersed therein by the drill, and analyzing said drilling fluid emerging from the well for said contents appearing therein in said varied concentration.

13. The method of logging wells being drilled by the rotary method in which a drilling fluid circulated through the well is analyzed at the top of the well for portions of the strata dispersed therein by the drill, comprising, modulating a drilling operation at a predetermined frequency adapted to correspondingly vary the rate of dispersal by said drill of said portions of said strata per unit volume of said drilling fluid, and analyzing said drilling fluid for said portions appearing therein in a concentration pattern corresponding to said frequency.

14. In the logging of wells being drilled by the rotary method by analysis of the drilling fluid circulated through the well during the drilling thereof, the method of distinguishing significant changes in the character of the drilling fluid produced by the drilling of a stratum from non-significant changes otherwise produced in said drilling fluid, comprising, modulating a drilling operation at a predetermined frequency adapted to produce a characteristic concentration pattern in the drilling fluid of the portions of said stratum dispersed therein by the drill, analyzing said drilling fluid emerging from the well for said portions appearing therein in said pattern, and correlating the analysis of said pattern with the depth of said stratum.

15. The method of logging wells being drilled by the rotary method in which a drilling fluid circulated through the well is analyzed at the top of the well for portions of the strata dispersed therein by the drill, comprising, modulating the rate of advancement of the drill at a pre-determined frequency to correspondingly vary the rate of dispersal by said drill of said strata portions per unit volume of said drilling fluid, and analyzing said drilling fluid for said portions appearing therein in a concentration pattern corresponding to said frequency.

16. The method of logging wells being drilled by the rotary method in which a drilling fluid circulated through the well is analyzed at the top of the well for portions of the strata dispersed therein by the drill, comprising, modulating the rate of advancement of the drill at a pre-determined frequency while maintaining the circulation of said drilling fluid at a substantially constant rate, whereby the rate of dispersal by said drill of said strata portions per unit volume of said drilling fluid is correspondingly varied, and analyzing said drilling fluid for said strata portions appearing therein in a concentration pattern corresponding to said frequency.

17. The method of logging wells being drilled by the rotary method in which a drilling fluid circulated through the well is analyzed at the top of the well for portions of the strata dispersed therein by the drill, comprising, modulating the rate of circulation of said drilling fluid through the well at a pre-determined frequency, whereby the rate of dispersal by said drill of said strata portions per unit volume of said drilling fluid is correspondingly varied, and analyzing said drilling fluid for said strata portions appearing therein in a concentration pattern corresponding to said frequency.

18. The method of logging wells being drilled by the rotary method in which a drilling fluid circulated through the well is analyzed at the top of the well for portions of the strata dispersed therein by the drill, comprising, modulating the rate of circulation of said drilling fluid through the well at a pre-determined frequency, while maintaining the advancement of the drill at a substantially constant rate, whereby the rate of dispersal by said drill of said strata portions per unit volume of said drilling fluid is correspondingly varied, and analyzing said drilling fluid for said strata portions appearing therein in a concentration pattern corresponding to said frequency.

19. The method of logging wells being drilled by the rotary method in which a drilling fluid circulated through the well is analyzed at the top of the well for portions of the strata dispersed therein by the drill, comprising, modulating the rate of advancement of the drill at a pre-determined frequency, simultaneously modulating the rate of circulation of the drilling fluid at the same frequency but in reverse direction to thereby produce a characteristic pattern of relatively high and low concentration of said strata portions in said drilling fluid, and analyzing said drilling fluid for said strata portions appearing therein in said pattern.

JOHN T. HAYWARD.

REFERENCES CITED

The following references are of record in the file of this patent:

UNITED STATES PATENTS

| Number | Name | Date |
|---|---|---|
| 2,214,674 | Hayward | Sept. 10, 1940 |